United States Patent
Karimi Jahromi

(10) Patent No.: US 11,376,696 B2
(45) Date of Patent: Jul. 5, 2022

(54) CONVERTING A CNC MILLING MACHINE TO A CNC WIRE SAW

(71) Applicant: Matin Karimi Jahromi, Jahrom (IR)

(72) Inventor: Matin Karimi Jahromi, Jahrom (IR)

( * ) Notice: Subject to any disclaimer, the term of this patent is extended or adjusted under 35 U.S.C. 154(b) by 0 days.

(21) Appl. No.: 17/207,620

(22) Filed: Mar. 20, 2021

(65) Prior Publication Data

US 2021/0205941 A1      Jul. 8, 2021

Related U.S. Application Data

(60) Provisional application No. 63/005,225, filed on Apr. 4, 2020.

(51) Int. Cl.
*B23Q 37/00* (2006.01)
*B23P 23/02* (2006.01)
(Continued)

(52) U.S. Cl.
CPC .............. *B23Q 1/015* (2013.01); *B23C 1/002* (2013.01); *B23P 23/02* (2013.01); *B23Q 37/002* (2013.01);
(Continued)

(58) Field of Classification Search
CPC ........... Y10T 83/9292; Y10T 29/50–52; Y10T 409/307728; Y10T 409/308288;
(Continued)

(56) References Cited

U.S. PATENT DOCUMENTS 3,867,054 A * 2/1975 Muller .................... B23Q 37/00
                                                        29/560
5,018,420 A * 5/1991 Plomb .................... B23D 51/20
                                                        83/785
(Continued)

FOREIGN PATENT DOCUMENTS

DE            3622482 A1 *  1/1988
DE      102013005908 A1 * 10/2014
(Continued)

OTHER PUBLICATIONS

Machine Translation of DE 3622482 A1, which DE '482 A1 was published Jan. 1998.*

*Primary Examiner* — Erica E Cadugan
(74) *Attorney, Agent, or Firm* — Bajwa IP Law Firm; Haris Zaheer Bajwa

(57) ABSTRACT

An attachment for converting a CNC milling machine to a CNC wire saw machine. The attachment may include a gantry that may be coupled with a respective gantry of the CNC milling machine, a carriage that may be attached to and moveable with a respective carriage of the CNC milling machine. A drive pulley of the system may be coupled with and driven by a spindle of the CNC milling machine. The drive pully may drive a wire saw through an assembly of idler pulleys. A wire tension mechanism may keep the wire fully stretched. The wire tension mechanism may include a curved guide rail mounted on the gantry and a vertical guide rail mounted on the carriage. A slider that slides vertically on the vertical guide rail and follows the curved guide rail may house a tension wheel that may keep the wire at a fully stretched state.

14 Claims, 9 Drawing Sheets

(51) Int. Cl.
*B23C 1/06* (2006.01)
*B23D 57/00* (2006.01)
*B23Q 1/01* (2006.01)
*B23C 1/00* (2006.01)

(52) U.S. Cl.
CPC ...... *Y10T 29/50* (2015.01); *Y10T 409/308288* (2015.01)

(58) Field of Classification Search
CPC .................. B23Q 37/002; B23Q 1/012; B23Q 3/155–3/15793; B23P 23/02; B23D 57/0076; B23D 61/185; B23D 57/0007; B23D 57/0023; B23D 57/003–0069; B23D 35/00–47/34; B26D 1/547–1/5535; B26F 3/12; B28D 5/045; B24B 27/0633; B23C 1/002
USPC ............ 29/560–650; 83/651.1; 409/202, 212
See application file for complete search history.

(56) References Cited

U.S. PATENT DOCUMENTS

| | | | | |
|---|---|---|---|---|
| 5,493,767 | A * | 2/1996 | Susnjara | B23Q 16/001 144/144.1 |
| 2006/0064385 | A1 * | 3/2006 | Susnjara | G06F 21/121 705/59 |
| 2016/0004247 | A1 * | 1/2016 | Susnjara | G05B 19/40935 700/98 |

FOREIGN PATENT DOCUMENTS

| | | | |
|---|---|---|---|
| JP | 04-304921 A | * | 10/1992 |
| JP | 05-154729 A | * | 6/1993 |

* cited by examiner

CONVERTING A CNC MILLING MACHINE TO A CNC WIRE SAW

CROSS-REFERENCE TO RELATED APPLICATION

This application claims the benefit of priority from pending U.S. Provisional Patent Application Ser. No. 63/005,225, filed on Apr. 4, 2020, and entitled "TRANSFORMER OF CNC MILLING TO CUTTING," which is incorporated herein by reference in its entirety.

TECHNICAL FIELD

The present disclosure relates to wire saw machines, particularly to computer numerically controlled (CNC) wire saw machines. More particularly, the present disclosure relates to systems and methods for converting a CNC milling machine to a CNC wire saw machine or a CNC cutting machine.

BACKGROUND

A computer numerical control (CNC) machine may be utilized in a shop for performing various tasks, such as routing, drilling, sawing, and sanding. For example, a CNC milling machine may be utilized for automatically removing material from a workpiece by advancing a rotary cutter into the workpiece. In a CNC mill, a controller is utilized for controlling the operations and movements of a toolhead relative to the workpiece. The tool head may be displaced along three mutually perpendicular axes of x, y, and z with respect to the workpiece and this way the controller may be able to urge the toolhead to cut the workpiece according to a preprogrammed cutting pattern. CNC mills or milling machines may be developed as machining centers, in which milling machines may be enhanced by automatic tool changers that allow for performing various tasks using a single machine with different tool heads. The preference in a shop is to have a fewer number of machines for performing a wide range of tasks. Consequently, such versatile machining centers are attractive from a practical point of view.

Another cutting machine that may often be utilized in a shop for cutting various materials, such as wood, stone, or foam is a wire saw machine. A wire saw machine utilizes a metal wire or cable to cut into the workpiece. The advantage of cutting a workpiece with wire is the improved cutting precision of a wire saw in comparison with a blade saw. Wire saws are specifically attractive for performing precise vertical cuts on a workpiece. For example, a precise wire saw machine may be utilized for performing fine artistic wood cuttings to create delicate wooden art. A combination of CNC milling and cutting machines may be required for finishing a perfect wooden object. A CNC milling machine may perform all the required carving and milling, post which, a wire saw may then be utilized for performing precise cuts.

It would be beneficial if a versatile CNC machine may be developed that not only allows for changing tool heads for performing different tasks with different rotary cutting tool heads, but also allows for changing the tool head into a wire saw. There is, therefore, a need for a system that may allow for an easy transformation of a CNC milling machine to a CNC wire saw. Such conversion system may allow for using a single CNC milling machine in a shop for both milling and sawing various workpieces.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a system for converting a CNC milling machine to a CNC wire saw machine. An exemplary CNC milling machine may include a worktable that may be configured to support a workpiece on a top surface of the worktable, a first gantry that may be mounted over an exemplary worktable. An exemplary first gantry may be configured to be slidable along a first axis relative to an exemplary worktable. An exemplary CNC milling machine may further include a first carriage that may be mounted on a transversely disposed section of an exemplary first gantry. An exemplary first carriage may be configured to be slidable on an exemplary transversely disposed section of an exemplary first gantry along a second axis relative to an exemplary worktable. An exemplary second axis may be perpendicular to an exemplary first axis. An exemplary CNC milling machine may further include a spindle that may be mounted on and moveable with an exemplary first carriage.

An exemplary system for converting a CNC milling machine to a CNC wire saw machine may include a second gantry that may be configured to be coupled and moveable with an exemplary first gantry along an exemplary first axis. An exemplary second gantry may include a pair of parallel elongated support legs, where each elongated support leg of an exemplary pair of parallel elongated support legs may be positioned on a respective side of an exemplary worktable. An exemplary second gantry may further include an upper transverse beam that may be laid across upper ends of an exemplary pair of parallel elongated support legs along an exemplary second axis. An exemplary system may further include a second carriage slidably mounted on an exemplary upper transverse beam. An exemplary second carriage may be configured to be coupled with an exemplary first carriage. An exemplary second carriage may further be configured to be moveable with an exemplary first carriage along an exemplary second axis.

An exemplary system may further include a gearbox disposed within and moveable with an exemplary second carriage. An exemplary gearbox may be configured to be coupled with an exemplary spindle. An exemplary system may further include a drive pulley that may be coupled with an exemplary spindle via an exemplary gearbox. An exemplary gear box may further be configured to transfer a rotational movement of an exemplary spindle to an exemplary drive pulley. An exemplary system may further include a plurality of idler pulleys that may be mounted on an exemplary second gantry. An exemplary plurality of idler pulleys may be rotatable on a plane of rotation perpendicular to a plane of rotation of an exemplary spindle.

An exemplary system may further include a wire tension mechanism. An exemplary wire tension mechanism may include an extension leg that may be attached to or integrally formed with a first elongated support leg of an exemplary pair of parallel elongated support legs. An exemplary extension leg may be extended from an exemplary top end of an exemplary first elongated support leg along a longitudinal axis of an exemplary first elongated support leg. An exemplary wire tension mechanism may further include a curved guide rail, where a first end of an exemplary curved guide rail may be attached to or integrally formed with a top end of an exemplary extension leg, and a second opposing end of an exemplary curved guide rail attached to or integrally formed with an exemplary top end of a second elongated support leg of exemplary two elongated support legs. An exemplary curved guide rail may be bent downward on a transverse plane, where an exemplary transverse plane may be parallel with an exemplary pair of parallel elongated support legs and an exemplary upper transverse beam.

An exemplary wire tension mechanism may further include a vertical guide rail extended upward along a third axis from a top end of an exemplary second carriage. An exemplary third axis may be perpendicular to an exemplary second axis. An exemplary wire tension mechanism may further include a first bearing block that may be slidably coupled with an exemplary vertical guide rail. An exemplary first bearing block may be moveable along an exemplary third axis. An exemplary first bearing block may further include a follower that may be coupled with and moveable along an exemplary curved guide rail. An exemplary wire tension mechanism may further include a top tension wheel that may be mounted on an exemplary first bearing block. An exemplary top tension wheel may be rotatable about a rotational axis perpendicular to an exemplary upper transverse beam.

An exemplary system may further include a wire that may be attached to an exemplary drive pulley, an exemplary plurality of idler pulleys, and an exemplary top tension wheel. An exemplary drive pulley may be configured to drive an exemplary wire to travel through an exemplary drive pulley, an exemplary plurality of idler pulleys, and an exemplary top tension wheel, in an endless wire loop.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of a system or attachment for converting a CNC milling machine to a CNC wire saw machine. As mentioned before, it would be beneficial to have a system that may allow for an easy conversion of a CNC milling machine to a CNC wire saw machine, due to the fact that having fewer machines in a shop is a preference from a practical point of view. An exemplary system may be an attachment or an add-on system that may be added or attached to an existing CNC milling machine and thereby convert the existing CNC machine to a CNC wire saw machine. A tool head of an exemplary CNC milling machine may be removed from a spindle of an exemplary CNC milling machine and it may be replaced with a wire saw mechanism. An exemplary wire saw mechanism may be powered by a spindle of an exemplary milling machine and displacement of a cutting segment of an exemplary wire cutting mechanism relative to a workpiece may be actuated by existing actuators of an exemplary CNC milling machine.

An exemplary system for converting a CNC milling machine to a CNC wire saw machine may easily and removably be coupled to an existing CNC milling machine. Furthermore, a movement of an exemplary CNC wire saw may be controlled by an existing controller of an exemplary CNC milling machine. Such easy addition of an exemplary system for converting a CNC milling machine to a CNC wire saw machine with only simple mechanical assemblies may allow for developing a versatile machine that may be capable of functioning both as a mill and a wire saw.

Figure 1A:
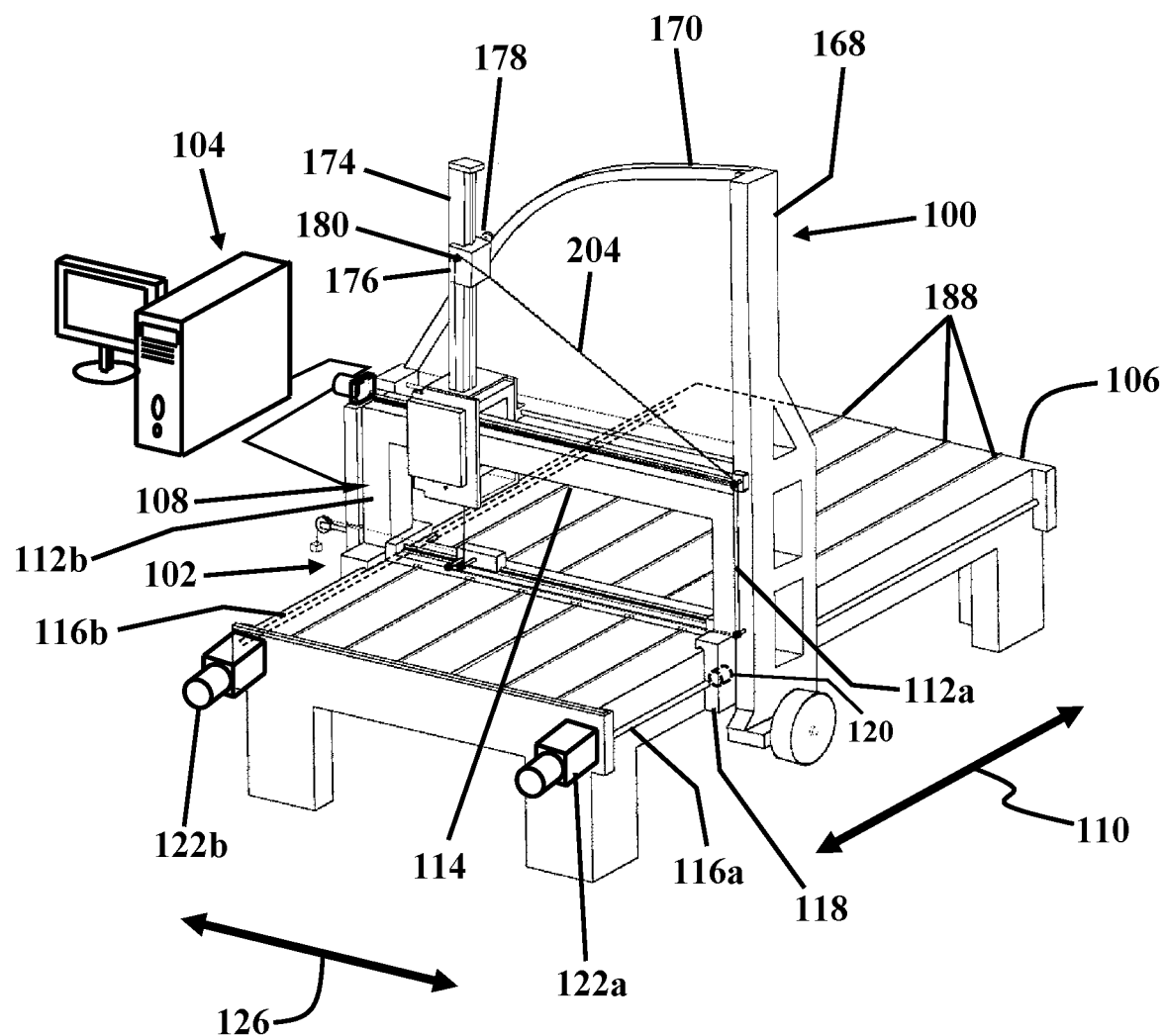
FIG. 1A illustrates a perspective view of a system for converting a CNC milling machine to a CNC wire saw machine, where the system is mountable on a CNC milling machine, consistent with one or more exemplary embodiments of the present disclosure.
Figure 1B:
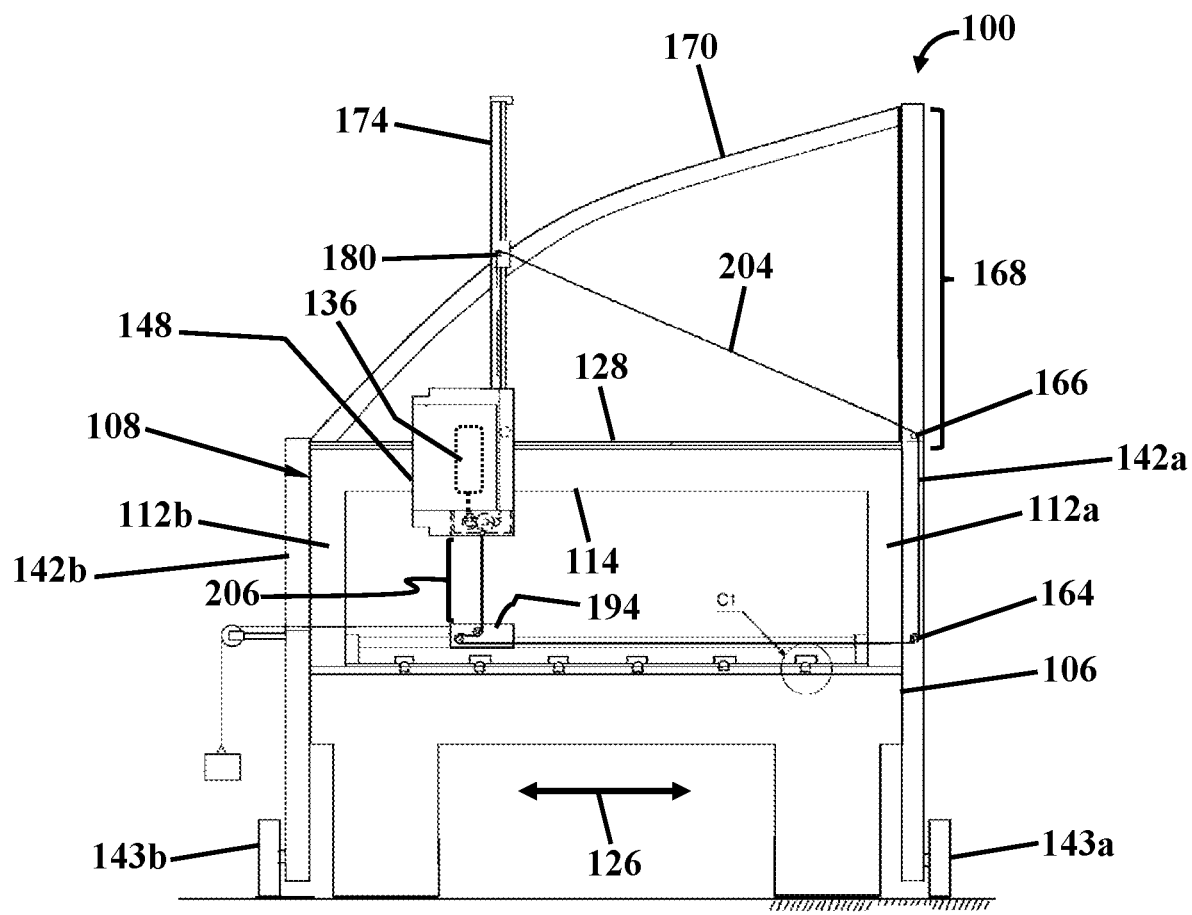
FIG. 1B illustrates a front view of a system for converting a CNC milling machine to a CNC wire saw machine, where the system is mountable on a CNC milling machine, consistent with one or more exemplary embodiments of the present disclosure.
Figure 1C:
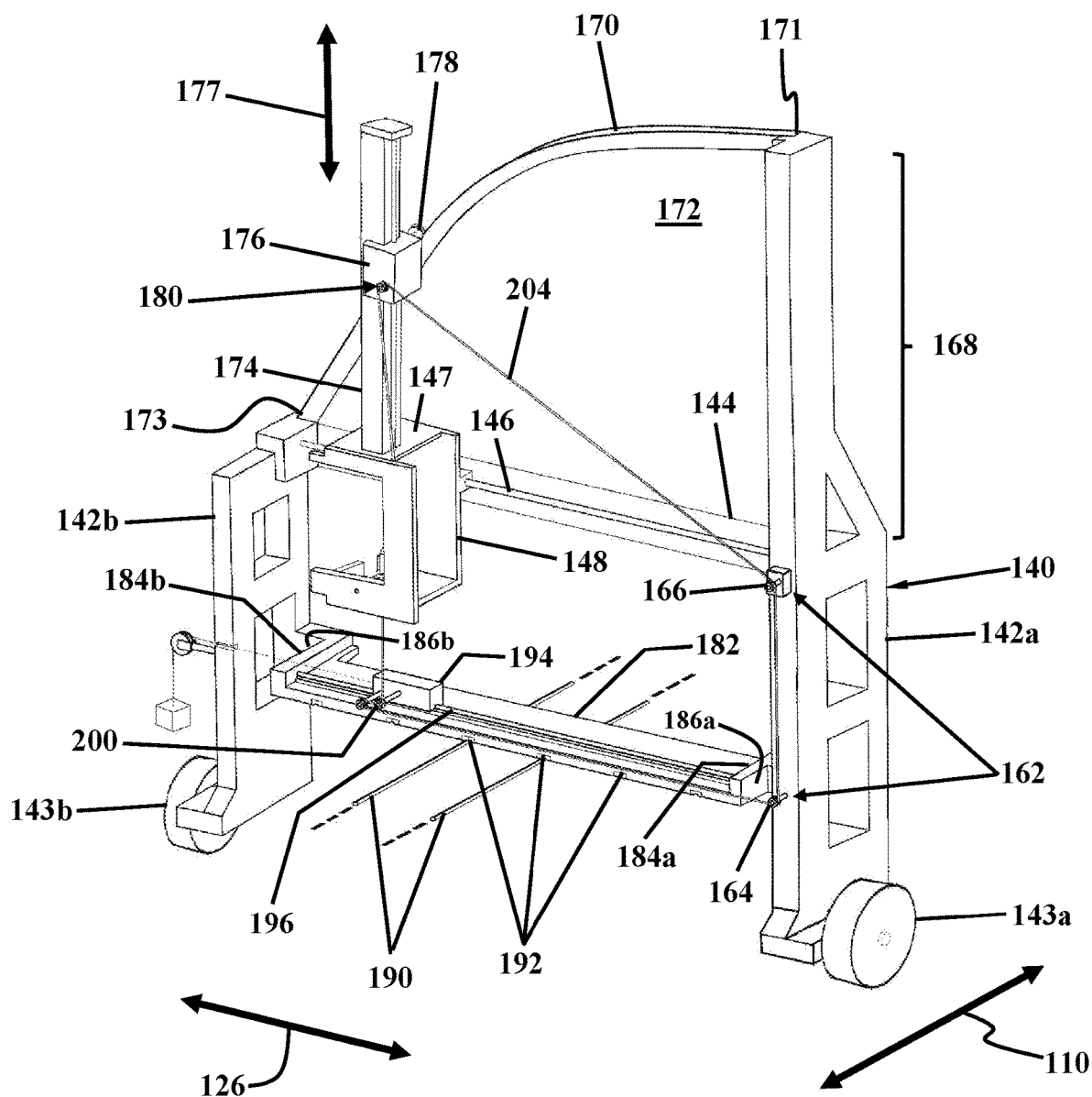
FIG. 1C illustrates a perspective view of a system for converting a CNC milling machine to a CNC wire saw machine, consistent with one or more exemplary embodiments of the present disclosure.

FIG. 1A illustrates a perspective view of a system 100 for converting a CNC milling machine to a CNC wire saw machine, where system 100 is mountable on a CNC milling machine 102, consistent with one or more exemplary embodiments of the present disclosure. FIG. 1B illustrates a front view of a system 100 for converting a CNC milling machine to a CNC wire saw, where system 100 is mountable on a CNC milling machine 102, consistent with one or more exemplary embodiments of the present disclosure. FIG. 1C illustrates a perspective view of system 100 for converting a CNC milling machine to a CNC wire saw, consistent with one or more exemplary embodiments of the present disclosure.

In an exemplary embodiment, CNC milling machine 102 may be a three to five-axis CNC machine that may be coupled with a controller 104. Controller 104 may be a programmable controller that may be configured to operate CNC milling machine 102. In an exemplary embodiment, CNC milling machine 102 may include a worktable 106 that may be configured to support and fixedly secure a workpiece (not illustrated). An exemplary workpiece may be an object made of wood, stone, or foam that is to be cut. An exemplary workpiece may be fixedly secured on worktable 106 utilizing fastening tools, such as clamps. As used herein, an exemplary workpiece fixedly secured on worktable 106 may refer to an exemplary workpiece clamped or fastened to worktable 106, such that the workpiece does not have any unwanted translational or rotational movements relative to worktable 106.

In an exemplary embodiment, CNC milling machine 102 may further include a first gantry 108 that may be mounted over worktable 106. First gantry 108 may bridge over worktable 106 and may be slidably moveable along a first axis 110 relative to worktable 106. First gantry 108 may be configured to provide a platform for mounting a milling device over worktable 106. In an exemplary embodiment, first gantry 108 may include a pair of leg sections (112a, 112b) and a transversely disposed section 114 that may be connected to and span upper ends of pair of leg sections (112a, 112b) above worktable 106. In an exemplary embodiment, a pair of drive screws (116a, 116b) may be mounted on worktable 106, where each drive screw of pair of drive screws (116a, 116b) may be mounted on a respective side of worktable 106 extended along first axis 110. In an exemplary embodiment, each leg section of pair of leg sections (112a, 112b) may include a respective sled that may be coupled with and driven by a corresponding drive screw of pair of drive screws (116a, 116b). For example, leg section 112a may include sled 118 that may be coupled with and driven by drive screw 116a.

In an exemplary embodiment, a sled may include a nut attached to a lower end of each leg section of pair of leg sections (112a, 112b), where the nut may further be engaged with each respective drive screw of pair of drive screws (116a, 116b). For example, sled 118 may include a nut 120 housed within sled 118 attached to a lower end of leg section 112a, where nut 120 may further be engaged with drive screw 116a. In an exemplary embodiment, a respective side servo-motor may be coupled with each respective drive screw of pair of drive screws (116a, 116b), where each respective side servo-motor may be configured to drive a corresponding drive screw of pair of drive screws (116a, 116b). This way, each respective side servo-motor may actuate a translational movement of each leg section of pair of leg sections (112a, 112b) along first axis 110. For example, a side servo-motor 122a may be coupled with drive screw 116a, where side servo-motor 122a may be configured to actuate a rotational movement of drive screw 116a that may be transformed into a linear movement of nut 120 along drive screw 116a. Nut 120 may be coupled with leg section 112a, consequently linear movement of nut 120 along drive screw 116a may urge a linear displacement of leg section 112a along first axis 110. Similarly, a side servo-motor 122b may be coupled with drive screw 116b, where side servo-motor 122b may be configured to actuate a translational movement of leg section 112b along first axis 110. In an exemplary embodiment, each side servo-motor of CNC milling machine 102 may further be coupled with controller 104 to allow for controller 104 to control the displacement of first gantry 108 relative to worktable 106 along first axis 110.

Figure 2:
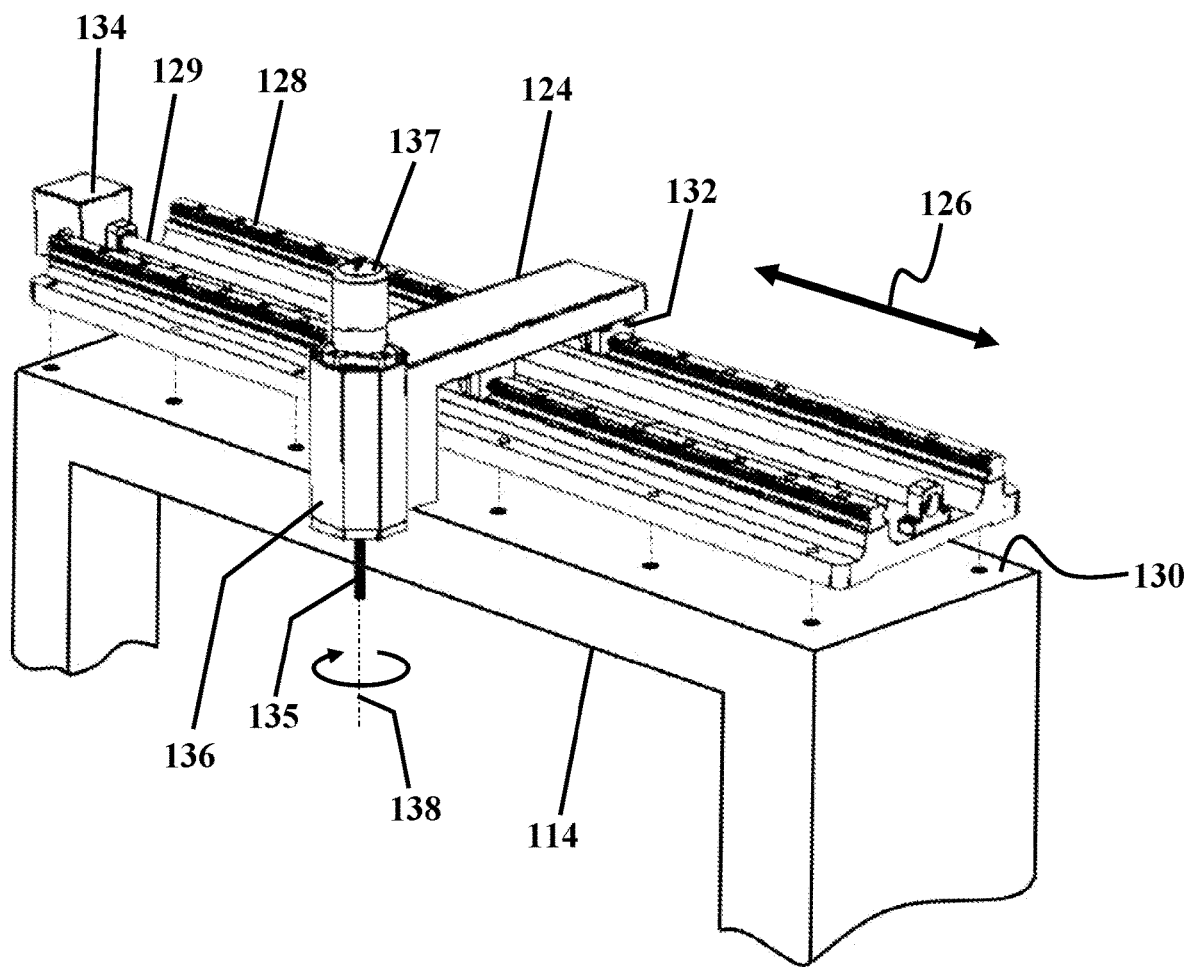
FIG. 2 illustrates a perspective view of a displacement mechanism for a spindle of a CNC milling machine, consistent with one or more exemplary embodiments of the present disclosure.

FIG. 2 illustrates a perspective view of a displacement mechanism for a spindle 136 of CNC milling machine 102, consistent with one or more exemplary embodiments of the present disclosure. In an exemplary embodiment, CNC milling machine 102 may further include a first carriage 124 that may be slidably mounted on transversely disposed section 114 of first gantry 108. In an exemplary embodiment, first carriage 124 may be configured to be slidable on transversely disposed section 114 along a second axis 126 relative to worktable 106. In an exemplary embodiment, second axis 126 may be parallel with a longitudinal axis of transversely disposed section 114. In an exemplary embodiment, a top guide rail 128 may be mounted on a top face 130 of transversely disposed section 114. First carriage 124 may be mounted on top guide rail 128 via a slider mechanism 132, which facilitates a translational sliding movement of first carriage 124 on transversely disposed section 114 along second axis 126.

In an exemplary embodiment, a linear actuating mechanism, such as a drive screw may be coupled with first carriage 124 to drive a translational movement of first carriage 124 on top guide rail 128 of transversely disposed section 114 along second axis 126. For example, a transverse drive screw 129 may be mounted on a top face 130 of transversely disposed section 114 coupled with first carriage 124. Transverse drive screw 129 may be driven by a servo-motor 134 operated by controller 104. Such arrangement of servo-motor 134 and transverse drive screw 129 may allow for controller 104 to control the displacement of first carriage 124 along second axis 126 relative to worktable 106.

In an exemplary embodiment, second axis 126 may be perpendicular to first axis 110. In an exemplary embodiment, first axis 110 may be parallel with a longitudinal axis of worktable 106 and second axis 126 may be parallel with a transversal axis of worktable 106. In an exemplary embodiment, such coupling of controller 104 with side and transverse servo-motors may allow for controller 104 to control a two-dimensional movement of first carriage 124 along two orthogonal first axis 110 and second axis 126 relative to worktable 106.

In an exemplary embodiment, CNC milling machine 102 may further include a spindle 136 that may be mounted on and moveable with first carriage 124. In an exemplary embodiment, spindle 136 may include a rotary shaft 135 that may be coupled to a motor 137. In an exemplary embodiment, motor 137 may actuate a rotational movement of rotary shaft 135 of spindle 136 about a rotational axis 138. In an exemplary embodiment, rotational axis 138, first axis 110, and second axis 126 may be mutually perpendicular. In an exemplary embodiment, rotational axis 138 may be along a longitudinal axis of spindle 136. As used herein, spindle 136 may refer to entire rotary shaft, motor, and bearings of spindle 136, which are not described or illustrated in detail for simplicity. In an exemplary embodiment, spindle 136 may further be displaceable along rotational axis 138 relative to worktable 106.

In an exemplary embodiment, system 100 for converting a CNC milling machine to a CNC wire saw machine may be configured to convert a CNC milling machine similar to CNC milling machine 102 into a CNC wire saw machine. In an exemplary embodiment, system 100 may include a second gantry 140 that may be configured to be coupled and moveable with first gantry 108 along first axis 110.

In an exemplary embodiment, second gantry 140 may include a pair of parallel elongated support legs, namely, a first elongated support leg 142a and a second elongated support leg 142b. In an exemplary embodiment, each elongated support leg of pair of parallel elongated support legs (142a, 142b) may be positioned on a respective lateral side of worktable 106. In an exemplary embodiment, pair of parallel elongated legs (142a, 142b) may be vertically extended legs, where a longitudinal axis of each elongated support leg of pair of parallel elongated support legs (142a, 142b) may be mutually perpendicular to first axis 110 and second axis 126. As used herein, a longitudinal axis of an object is an axis associated with the longest dimension of that object.

In an exemplary embodiment, each elongated support leg of pair of parallel elongated support legs (142a, 142b) may be provided with a rotatable wheel at a bottom end of each elongated support leg. For example, first elongated support leg 142a may be provided with a rotatable wheel 143a at the bottom end of first elongated support leg 142a and second elongated support leg 142b may be provided with a rotatable wheel 143b at the bottom end of second elongated support leg 142b. In an exemplary embodiment, rotatable wheels (143a, 143b) may facilitate displacement of second gantry 140 along first axis 110. In an exemplary embodiment, second gantry 140 may further include an upper transverse beam 144 that may be laid across upper ends of pair of parallel elongated support legs (142a, 142b). In an exemplary embodiment, upper transverse beam 144 may be extended transversely along the second axis 126 between pair of parallel elongated support legs (142a, 142b). As used herein, laying across may refer to attaching upper transverse beam 144 to upper ends of pair of parallel elongated support legs (142a, 142b). In an exemplary embodiment, upper transverse beam 144 may be integrally formed with upper ends of pair of parallel elongated support legs (142a, 142b).

In an exemplary embodiment, second gantry 140 may further include an upper guide rod 146 that may be mounted on and extended along upper transverse beam 144. In an exemplary embodiment, upper guide rod 146 may extend parallel with upper transverse beam 144 along second axis 126. In an exemplary embodiment, second gantry 140 may not have an upper transverse beam 144 and upper guide rod 146 may be attached directly to pair of parallel elongated support legs (142a, 142b).

In an exemplary embodiment, system 100 may further include a second carriage 148 that may be slidably coupled with upper guide rod 146 and may slide along upper guide rod 146. In an exemplary embodiment, upper guide rod 146 may include an elongated rod that may provide a guide track for the sliding movement of second carriage 148 along second axis 126. As used herein, second carriage 148 being slidably coupled with upper guide rod 146 may refer to coupling second carriage 148 and upper guide rod 146 utilizing a bearing unit 145 that may function as a slider.

Figure 3:
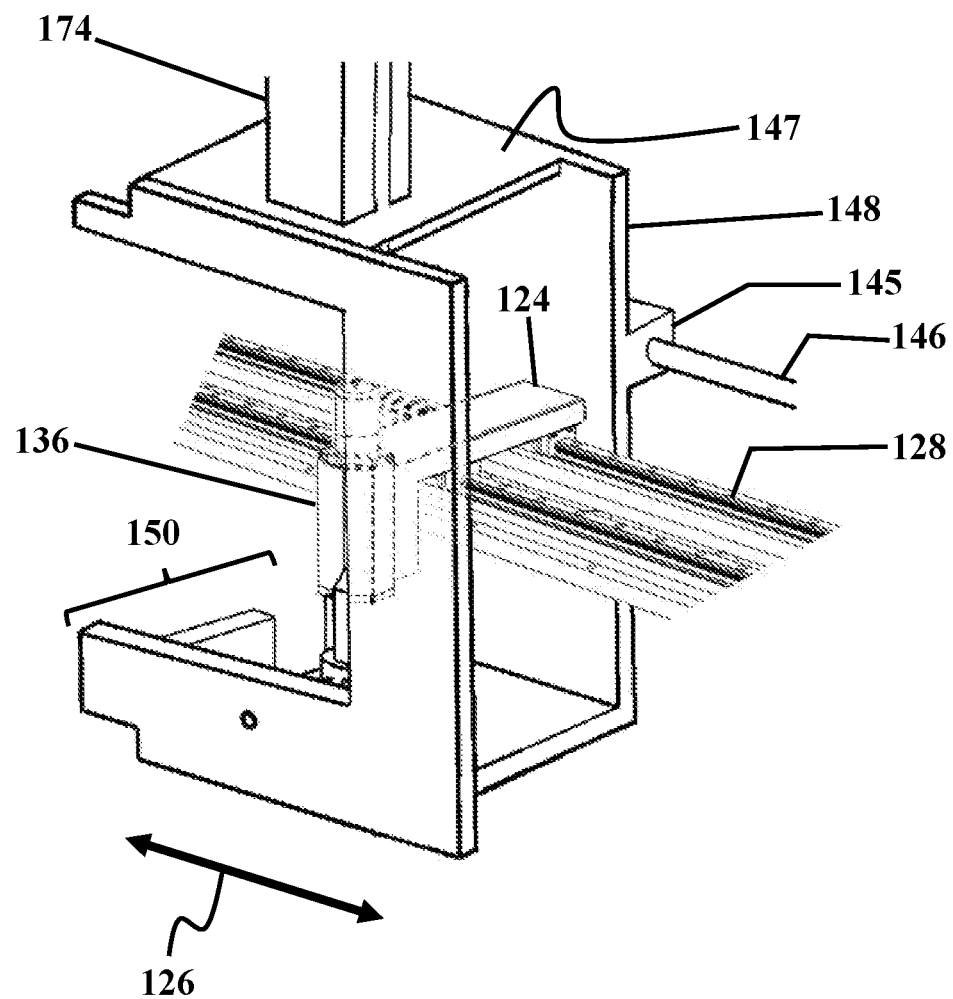
FIG. 3 illustrates a perspective view of a second carriage coupled with a first carriage, consistent with one or more exemplary embodiments of the present disclosure.

FIG. 3 illustrates a perspective view of second carriage 148 coupled with first carriage 124, consistent with one or more exemplary embodiments of the present disclosure. In an exemplary embodiment, second carriage 148 may be configured to be coupled with first carriage 124. In an exemplary embodiment, second carriage 148 may further be configured to be moveable with first carriage 124 along second axis 126. In other words, second carriage 148 may assume a linear translational movement along second axis 126 on upper guide rod 146 in response to servo-motor 134 and transverse drive screw 129 driving a linear displacement of first carriage 124 along second axis 126 relative to worktable 106. In an exemplary embodiment, second carriage 148 may encompass first carriage 124 and may be attached to first carriage 124 utilizing removable fastening tools, such as clamps and screws.

In an exemplary embodiment, second gantry 140 may be configured to be attached to first gantry 108 such that second gantry 140 may be moveable with first gantry 108. In an exemplary embodiment, second gantry 140 may assume a linear translational movement along first axis 110 relative to worktable 106 in response to first gantry 108 being driven by pair of drive screws (116a, 116b) in a linear displacement along first axis 110. In an exemplary embodiment, coupling or attaching second gantry 140 to first gantry 108 may refer to coupling or attaching pair of parallel elongated support legs (142a, 142b) to respective pair of leg sections (112a, 112b). For example, first elongated support leg 142a may be coupled with or attached to leg section 112a and second elongated support leg 142b may be coupled with or attached to leg section 112b. In an exemplary embodiment, second gantry 140 may be coupled with first gantry 108 as a removeable add-on that may be removed from first gantry 140 when desired. Accordingly, second gantry 140 may be coupled with first gantry 108 via removeable fastening tools, such as clamps or screws.

Figure 4:
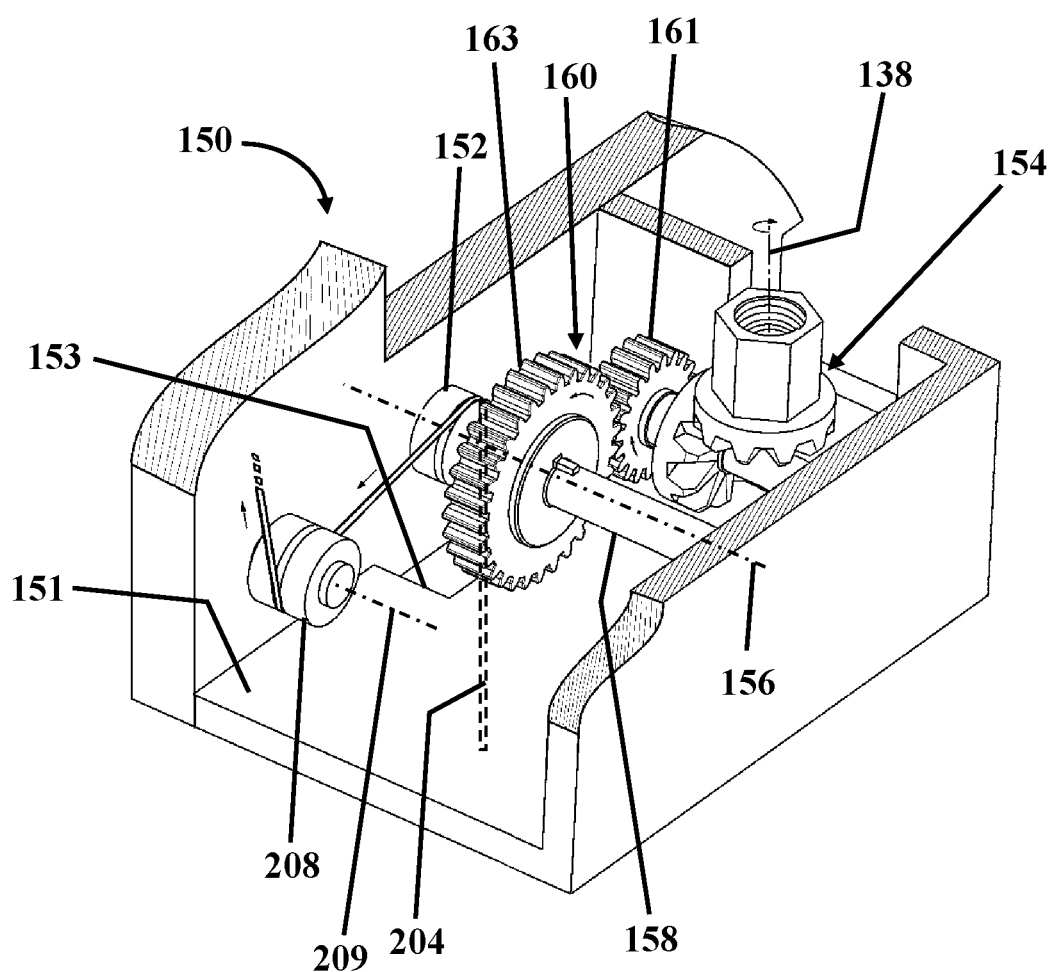
FIG. 4 illustrates a sectional perspective view of a gearbox, consistent with one or more exemplary embodiments of the present disclosure.

In an exemplary embodiment, system 100 may further include a gearbox 150 that may be disposed within second carriage 148. FIG. 4 illustrates a sectional perspective view of gearbox 150, consistent with one or more exemplary embodiments of the present disclosure. In an exemplary embodiment, gearbox 150 may be configured to be coupled with spindle 136. In an exemplary embodiment, system 100 may further include a drive pulley 152 disposed within gear box 150 that may be coupled with spindle 136 via gearbox 150. In an exemplary embodiment, gear box 150 may further be configured to transfer a rotational movement of spindle 136 to drive pulley 152.

In an exemplary embodiment, gearbox 150 may include a bevel gear set 154 that may be coupled between spindle 136 and drive pulley 152. Bevel gear set 154 may be configured to transfer the rotational movement of spindle 136 to drive pulley 152, such that a rotational axis 156 of drive pulley 152 may be perpendicular to rotational axis 138 of spindle 136. In an exemplary embodiment, drive pulley 152 may be coaxially mounted on a drive shaft 158, where drive shaft 158 may be rotatably coupled with bevel gear set 154 utilizing a spur gear set 160. In an exemplary embodiment, gear box 150 may be configured to change a direction of rotational movement of spindle 136 utilizing bevel gear set 154 and gear box 150 may further be configured to change rotational speed utilizing spur gear set 160. In an exemplary embodiment, spur gear set 160 may include a small gear 161 that may mesh with a large gear 163. Small gear 161 may be rotatably coupled with bevel gear set 154 and large gear 163 may be rotationally coupled with drive shaft 158. In an exemplary embodiment, such coupling of small gear 161 and large gear 163 may allow for transferring an output rotational movement of bevel gear set 154 to drive shaft 158 with a lower rotational speed and more torque in comparison with the rotational speed and the torque of spindle 136.

In an exemplary embodiment, system 100 may further include a plurality of idler pulleys 162 that may be mounted on second gantry 140. In an exemplary embodiment, plurality of idler pulleys 162 may be rotatable on a plane of rotation perpendicular to a plane of rotation of spindle 136. As used herein, axis of rotation, speed of rotation, and plane of rotation of spindle 136 may respectively refer to axis of rotation, speed of rotation, and plane of rotation of rotary shaft 135 of spindle 136. In an exemplary embodiment, plurality of idler pulleys 162 may include a lower idler pulley 164 that may be mounted on a lower portion of first elongated support leg 142a and an upper idler pulley 166 that may be mounted on an upper portion of first elongated support leg 142a. In an exemplary embodiment, upper idler pulley 166 may be vertically spaced apart from lower idler pulley 164 along a longitudinal axis of first elongated support leg 142a. In an exemplary embodiment, upper idler pulley 166 may be rotatable on a rotational plane of lower idler pulley 164.

In an exemplary embodiment, system 100 may further include a wire tension mechanism that may include an extension leg 168 that may be attached to or integrally formed with first elongated support leg 142a. In an exemplary embodiment, extension leg 168 may be extended from the top end of first elongated support leg 142a along a longitudinal axis of first elongated support leg 142a. In an exemplary embodiment, extension leg 168 and first elongated support leg 142a may be contiguously joined to form a support leg that may be longer than second elongated support leg 142b. In other words, a top end of extension leg 168 may be at a higher level compared to the top end of second elongated support leg 142b. In an exemplary embodiment, extension leg 168 may be perpendicular to upper transverse beam 144. In an exemplary embodiment, extension leg 168 and upper transverse beam 144 may be of the same length.

In an exemplary embodiment, the wire tension mechanism may further include a curved guide rail 170 that may be laid across the top end of extension leg 168 and the top end of second elongated support leg 142b. In an exemplary embodiment, a first end 171 of curved guide rail 170 may be attached to the top end of extension leg 168 and a second end 173 of curved guide rail 170 may be attached to the top end of second elongated support leg 142b. In an exemplary embodiment, curved guide rail 170 may curve downward with a concavity facing worktable 106 in a transverse plane 172. In an exemplary embodiment, transverse plane 172 may be parallel with pair of parallel elongated support legs (142a, 142b) and upper transverse beam 144. In an exemplary embodiment, curved guide rail 170 may extend in transverse plane 172 between the top end of extension leg 168 and the top end of second elongated support leg 142b, consequently, first end 171 of curved guide rail 170 may be at a higher level compared to second end 173 of curved guide rail 170.

In an exemplary embodiment, the wire tension mechanism may further include a vertical guide rail 174 that may extend upward along a third axis 177 from a top end 147 of second carriage 148. In an exemplary embodiment, third axis 177 may be mutually perpendicular to first axis 110 and second axis 126. In an exemplary embodiment, vertical guide rail 174 may be perpendicular to upper transverse beam 144. In an exemplary embodiment, a first bearing block 176 may be slidably coupled with vertical guide rail 174, such that first bearing block 176 may slide up and down vertical guide rail 174 along third axis 177.

Figure 6:
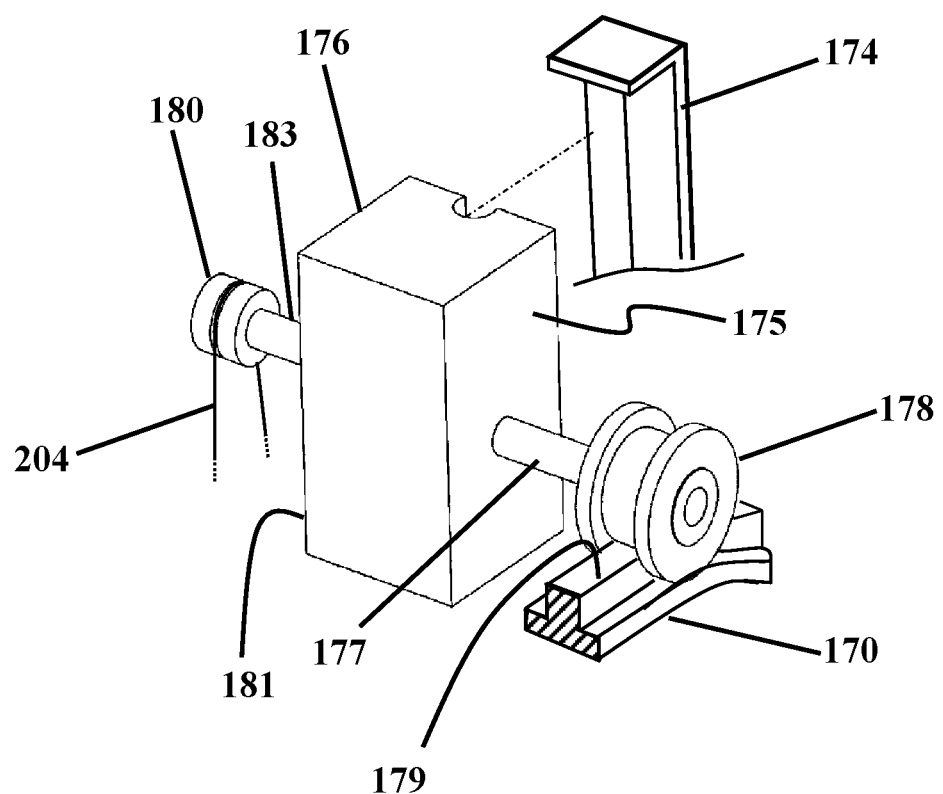
FIG. 6 illustrates an exploded view of a first bearing block coupled with a curved guide rail and a vertical guide rail, consistent with one or more exemplary embodiments of the present disclosure.

FIG. 6 illustrates an exploded view of first bearing block 176 coupled with curved guide rail 170 and vertical guide rail 174, consistent with one or more exemplary embodiments of the present disclosure. In an exemplary embodiment, first bearing block 176 may be an open linear bearing that may be moveable along a longitudinal axis of vertical guide rail 174. In an exemplary embodiment, the longitudinal axis of vertical guide rail 174 may be parallel with third axis 177. In an exemplary embodiment, first bearing block 176 may further include a follower 178 that may be coupled with and moveable along curved guide rail 170. In an exemplary embodiment, follower 178 may be a wheel or a sled that may be slidably coupled with curved guide rail 170. For example, follower 178 may be a wheel that may be rotatably attached to a first side 175 of first bearing block 176 via a connecting shaft 177. Follower 178 may be moveable on a top surface 179 of curved guide rail 170. In an exemplary embodiment, such arrangement of follower 178 may allow for curved guide rail 170 to guide a translational movement of first bearing block 176 along curved guide rail 170. Consequently, first bearing block 176 may be both vertically movable on vertical guide rail 174 and laterally moveable along curved guide rail 170 in response to linear displacement of second carriage 148 along second axis 126.

In an exemplary embodiment, the wire tension mechanism may further include a top tension wheel 180 that may be mounted on first bearing block 176. In an exemplary embodiment, top tension wheel 180 may be rotatably attached to a second side 181 of first bearing block 176 via a connecting rod 183, where top tension wheel 180 may be rotatable about a rotational axis perpendicular to upper transverse beam 144. In an exemplary embodiment, first side 175 and second side 181 of first bearing block 176 may be opposite each other. In other words, top tension wheel 180 and follower 178 may be mounted on opposite sides of first bearing block 176 and may be rotatable about parallel rotational axes.

In an exemplary embodiment, system 100 may further include a lower transverse beam 182 that may be connected to and transversely extended between pair of parallel elongated support legs (142a, 142b). In an exemplary embodiment, lower transverse beam 182 may be extended along second axis 126 and parallel with upper transverse beam 144. In an exemplary embodiment, lower transverse beam 182 may be attached to pair of parallel elongated support legs (142a, 142b) utilizing L-shaped connecting members (184a, 184b) that may be attached to or integrally formed with respective ends of lower transverse beam 182. In an exemplary embodiment, L-shaped connecting members (184a, 184b) may be laid on a plane perpendicular to the longitudinal axes of pair of parallel elongated support legs (142a, 142b) such that respective gaps (186a, 186b) may be provided between L-shaped connecting members (184a, 184b) and parallel elongated support legs (142a, 142b). In an exemplary embodiment, when second gantry 140 is coupled with first gantry 108, leg section 112a may be secured within gap 186a and leg section 112b may be secured within gap 186b. As used herein, leg sections (112a, 112b) being secured within respective gaps (186a, 186b) may refer to leg sections (112a, 112b) laterally fitted within respective gaps (186a, 186b) with no translational or rotational movement relative to parallel elongated support legs (142a, 142b).

In an exemplary embodiment, lower transverse beam 182 may further be slidably coupled to worktable 106, such that lower transverse beam 182 may slide over worktable 106 along first axis 110, in response to second gantry 140 being displaced along first axis 110. In an exemplary embodiment, worktable 106 may further include elongated grooves 188 on a top surface of worktable 106. In an exemplary embodiment, elongated grooves 188 may extend along first axis 110 and each may be fitted with a guide rod, such as guide rods 190. In an exemplary embodiment, lower transverse beam 182 may further include corresponding brass alloy grooves 192 on a lower surface of lower transverse beam 182 facing the top surface of worktable 106. In an exemplary embodiment, each groove of brass alloy grooves 192 may be slidably coupled with a respective guide rod of guide rods 190, for example via bearing units fitted within each groove of brass alloy grooves 192. In an exemplary embodiment, such coupling of lower transverse beam 182 with worktable 106 may facilitate a linear displacement of lower transverse beam 182 along first axis 110 over the top surface of worktable 106 and under a workpiece (not illustrated) that may be secured on worktable 106. In other words, when workpiece may be secured on worktable 106, lower transverse beam 182 may be positioned between a lower surface of the workpiece and the top surface of worktable 106 such that lower transverse beam 182 may be freely moveable under the workpiece.

In an exemplary embodiment, system 100 may further include a lower linear bearing block 194 that may be coupled with lower transverse beam 182. In an exemplary embodiment, a lower linear guide rod 196 may further be mounted on and extended along lower transverse beam 182 and lower linear bearing block 194 may be slidably coupled with lower linear guide rod 196. In an exemplary embodiment, lower linear bearing block 194 may be an open linear bearing that may be slidable along a longitudinal axis of lower transverse beam 182.

Figure 5:
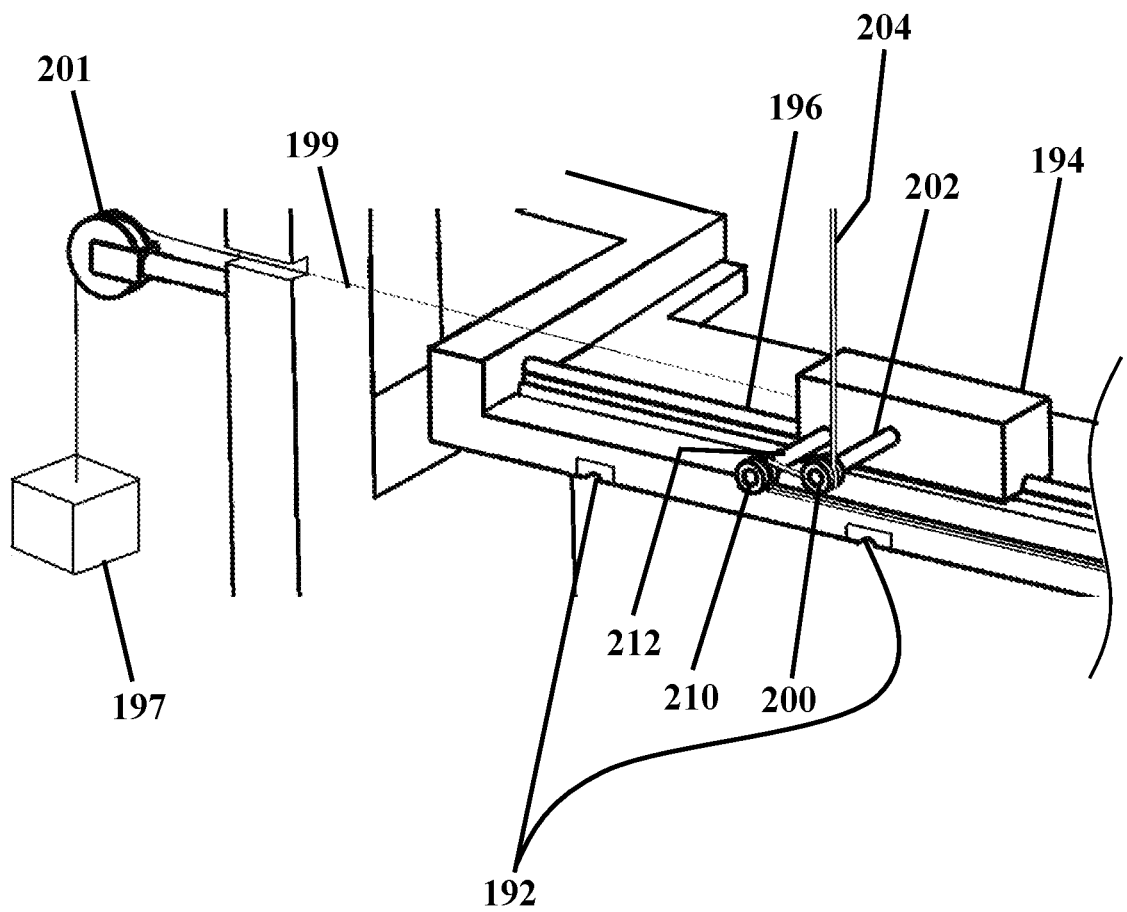
FIG. 5 illustrates a perspective view of a lower linear bearing block mounted on a lower linear guide rod, consistent with one or more exemplary embodiments of the present disclosure.

FIG. 5 illustrates a perspective view of lower linear bearing block 194 mounted on lower linear guide rod 196, consistent with one or more exemplary embodiments of the present disclosure. In an exemplary embodiment, plurality of idler pulleys 162 may further include a lower tension wheel 200 that may be mounted on lower linear bearing block 194 via a connecting rod 202. In an exemplary embodiment, a rotational axis of lower tension wheel 200 may be parallel with first axis 110 and lower tension wheel 200 may be vertically aligned with drive pulley 152 along an axis parallel with pair of parallel elongated support legs (142a, 142b). In an exemplary embodiment, lower tension wheel 200 may be rotatable on a plane of rotation of drive pulley 152. In an exemplary embodiment, lower idler pulley 164 may be horizontally aligned with lower tension wheel 200 along second axis 126. In an exemplary embodiment, lower idler pulley 164 may be rotatable on a rotational plane of lower tension wheel 200.

In an exemplary embodiment, system 100 may further include a wire 204 that may be attached to drive pulley 152, plurality of idler pulleys 162, and top tension wheel 180. As used herein, attaching wire 204 to drive pulley 152, plurality of idler pulleys 162, and top tension wheel 180 may refer to wire 204 spanning sequentially the space between drive pulley 152, plurality of idler pulleys 162, and top tension wheel 180. In an exemplary embodiment, drive pulley 152 may be configured to drive wire 204 to travel through drive pulley 152, plurality of idler pulleys 162, and top tension wheel 180 in an endless wire loop. In an exemplary embodiment, wire 204 may be engaged with a partial circumference of each of drive pulley 152, plurality of idler pulleys 162, and top tension wheel 180 and may travel in the aforementioned endless loop with the rotations of drive pulley 152, plurality of idler pulleys 162, and top tension wheel 180. In an exemplary embodiment, plurality of idler pulleys 162 and top tension wheel 180 may be driven members, which may be rotated by the travel of wire 204.

Figure 7:
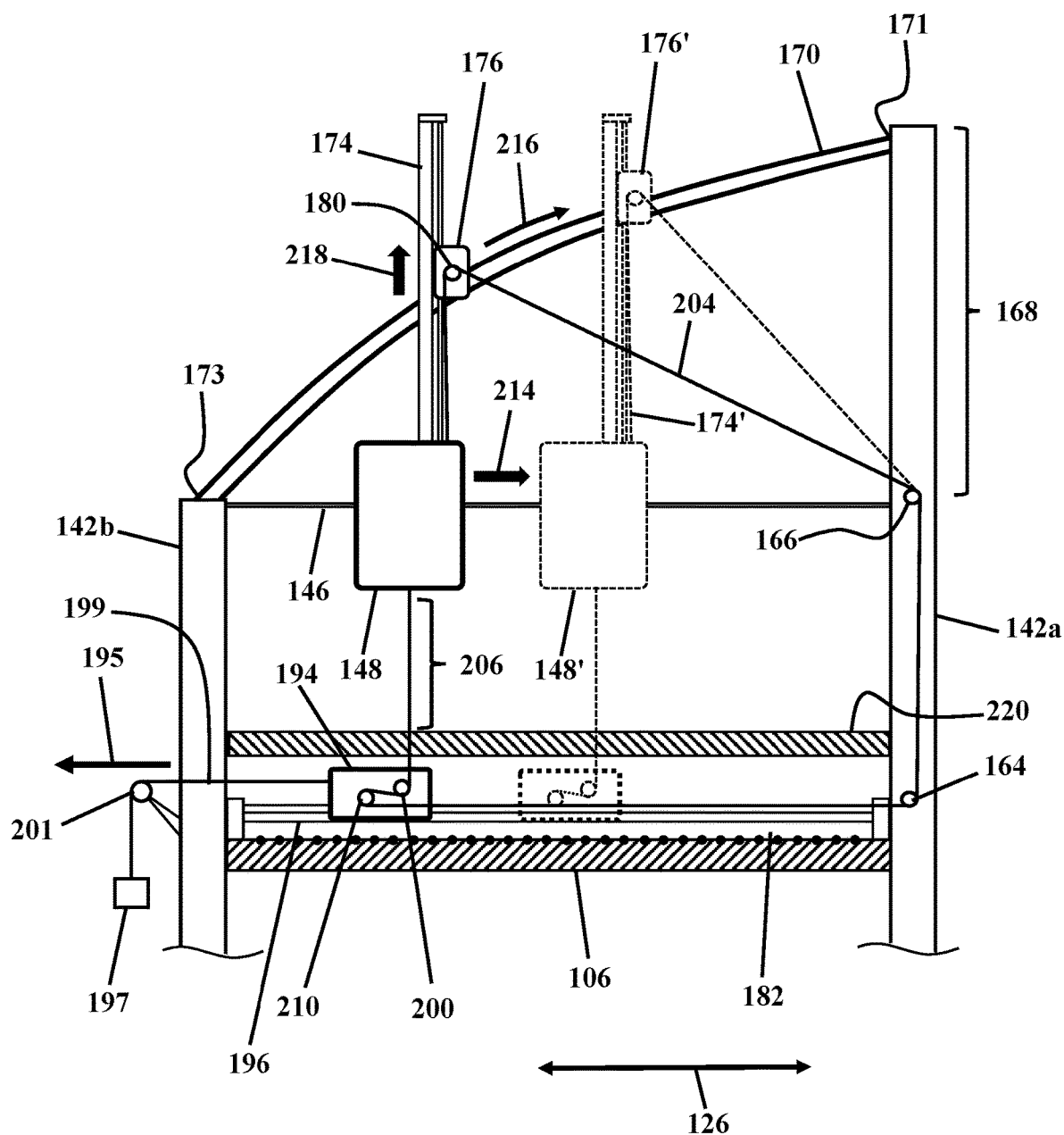
FIG. 7 illustrates a schematic front view of a system for converting a CNC milling machine to a CNC wire saw machine, where the system is mountable on a CNC milling machine, consistent with one or more exemplary embodiments of the present disclosure.

FIG. 7 illustrates a schematic front view of system 100, consistent with one or more exemplary embodiments of the present disclosure. In an exemplary embodiment, a cutting portion 206 of the endless wire loop may include a vertically extended segment of wire 204, which may be linearly stretched between drive pulley 152 and lower tension wheel 200. In an exemplary embodiment, drive pulley 152 and lower tension wheel 200 may be positioned on opposite sides of a workpiece 220, as was discussed earlier, and consequently, wire 204 or specifically, cutting portion 206 of the endless wire loop may travel into workpiece 220 when cutting workpiece 220 is started.

In an exemplary embodiment, since drive pulley 152 and lower tension wheel 200 may be displaced along second axis 126, which is perpendicular to vertically extended segments of wire 204, wire 204 may lose its tension or may even disengage drive pulley 152 and lower tension wheel 200. To avoid that, in an exemplary embodiment, both drive pulley 152 and lower tension wheel 200 may be utilized along with guide wheels.

In an exemplary embodiment, a first guide wheel 208 may be disposed within gear box 150. First guide wheel 208 may be rotatably mounted adjacent drive pulley 152 such that a rotational axis 209 of first guide wheel 208 may be parallel with rotational axis 156 of drive pulley 152. In an exemplary embodiment, wire 204 may approach drive pulley 152 in a direction parallel with a travel direction of wire in cutting portion 206 of the endless wire loop, then wire 204 may go around drive pulley 152 and first guide wheel 208 such that wire 204 may exit first guide wheel 208 in a direction parallel with the travel direction of wire in cutting portion 206 of the endless wire loop. To this end, wire 204 may engage an outer surface of drive pulley 152, which faces away from first guide wheel 208 and then may go over drive pulley 152 and toward a lower portion of first guide wheel 208. Wire 204 may then engage a lower surface of first guide wheel 208 and thereby may change direction and travel parallel with the travel direction of wire in cutting portion 206 of the endless wire loop. In an exemplary embodiment, such arrangement of drive pulley 152 and first guide wheel 208 may allow for gear box 150 to travel along second axis 126 while wire 204 may be stretched between drive pulley 152 and first guide wheel 208 regardless of translational movement of gear box 150 along with first carriage 124. As used herein, being perpendicular may refer to making an angle of 90±10° and being parallel may refer to making an angle between −10° and 10°.

In an exemplary embodiment, gear box 150 may further include a lower plate 151 with a slit 153 formed on lower plate 151 below drive pulley 152. In an exemplary embodiment, slit 153 may allow for wire 204 to travel into gear box 150.

In an exemplary embodiment, a second guide wheel 210 may be rotatably mounted on lower linear bearing block 194 via a connecting rod 212. Second guide wheel 210 may be rotatably mounted adjacent lower tension wheel 200 such that a rotational axis of second guide wheel 210 may be parallel with a rotational axis of lower tension wheel 200. In an exemplary embodiment, wire may approach lower tension wheel 200 in a direction parallel with a travel direction of wire in cutting portion 206 of the endless wire loop, then wire 204 may go around lower tension wheel 200 and second guide wheel 210 such that wire 204 may exit second guide wheel 208 in a direction perpendicular to a travel direction of wire in cutting portion 206 of the endless wire loop. In other words, wire 204 may exit second guide wheel 208 in a direction parallel with second axis 126. To this end, wire 204 may engage an outer surface of lower tension wheel 200, which faces away from second guide wheel 210 and then may go below lower tension wheel 200 and toward an upper portion of second guide wheel 210. Wire 204 may then travel around second guide wheel 210 and thereby may change direction and travel parallel with second axis 126. In an exemplary embodiment, such arrangement of lower tension wheel 200 and second guide wheel 210 may allow for lower linear bearing block 194 to travel along second axis 126 while wire 204 may be stretched between lower tension wheel 200 and second guide wheel 210 regardless of translational movement of gear box 150 along with first carriage 124.

In an exemplary embodiment, lower linear bearing block 194 may further be subjected to a lateral force constantly pulling lower linear bearing block 194 along second axis 126 but, in a direction 195, away from lower idler pulley 164. In an exemplary embodiment, a weight 197 may be attached to lower linear bearing block 194 utilizing a rope or wire 199 traveling on a support pulley 201. Rope or wire 199 may constantly pull lower linear bearing block 194 in direction 195 under the force exerted by weight 197. In an exemplary embodiment, such arrangement of lower linear bearing block 194 and weight 197 may allow for exerting a constant force on the endless wire loop that may keep the endless wire loop spanned the space between drive pulley 152, plurality of idler pulleys 162, and top tension wheel 180 in a fully stretched state.

In an exemplary embodiment, arrangement of top tension wheel 180 and how a vertical distance between top tension wheel 180 and drive pulley 152 changes as second carriage 148 travels along second axis 126 may further allow for keeping the endless wire loop spanned the space between drive pulley 152, plurality of idler pulleys 162, and top tension wheel 180 in a fully stretched state. As used herein, a fully stretched state of the endless wire loop may refer to a state where no unwanted bends occur in the endless wire loop segments, specifically cutting portion 206.

Referring to FIG. 7, in an exemplary embodiment, as second carriage 148 travels along second axis 126 towards first elongated support leg 142a in a direction shown by arrow 214, vertical guide rail 174 may be displaced in the same direction. For example, as second carriage 148 may travel along second axis 126 to a position designated by reference numeral 148', vertical guide rail 174 may follow in the same direction to a position designated by reference numeral 174'. Since, first bearing block 176 is both coupled with vertical guide rail 174 and curved guide rail 170, a displacement of vertical guide rail 174 in a direction shown by arrow 214 may urge first bearing block 176 to travel on curved guide rail 170 in a direction shown by arrow 216 to a position designated by reference numeral 176'. Such upward curved motion may be possible due to first bearing block 176 being able to slide on vertical guide rail 174 in a direction shown by arrow 218. In an exemplary embodiment, as first bearing block 176 travels on curved guide rail 170 in a direction shown by arrow 216, a vertical distance between top tension wheel 180 and drive pulley 152 may increase, which in turn may tighten the endless wire loop around drive pulley 152, plurality of idler pulleys 162, and top tension wheel 180. In other words, such increase in the vertical distance between top tension wheel 180 and drive pulley 152 may compensate for a decrease in a horizontal distance between lower tension wheel 200 and lower idle pulley 164. As used herein, a vertical distance may refer to a distance along third axis 177 and a horizontal distance may refer to a distance along second axis 126.

In an exemplary embodiment, a curvature of curved guide rail 170 may be defined by equation (1) below:

$$z = \frac{2kx}{x+k} \qquad \text{Equation (1)}$$

In equation (1) above, z denotes a vertical distance between a given point on curved guide rail 170 and second end 173 of curved guide rail 170 along third axis 177. Furthermore, x denotes a horizontal distance between the given point on curved guide rail 170 and second end 173 of curved guide rail 170 along second axis 126. In equation (1) above, k denotes a length of upper transverse beam 144 that may be equal to a length of extension leg 168. In other words, Equation (1) above defines a travel path of first bearing block 176 on curved guide rail 170 on a plane parallel with second axis 126 and third axis 177.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A system for converting a CNC milling machine to a CNC wire saw machine, the CNC milling machine comprising:
   a worktable configured to support a workpiece on a top surface of the worktable;
   a first gantry mounted over the worktable, the first gantry configured to be slidable along a first axis relative to the worktable; and
   a first carriage mounted on a transversely disposed section of the first gantry, the first carriage configured to be slidable on the transversely disposed section of the first gantry along a second axis relative to the worktable, the second axis perpendicular to the first axis;
a spindle mounted on and moveable with the first carriage, and
wherein the system comprises:
a second gantry configured to be coupled and moveable with the first gantry along the first axis, the second gantry comprising;
a pair of parallel elongated support legs, each elongated support leg of the pair of parallel elongated support legs positioned on a respective side of the worktable; and
an upper transverse beam laid across upper ends of the pair of parallel elongated support legs along the second axis;
a second carriage slidably mounted on the upper transverse beam, the second carriage configured to be coupled with the first carriage, the second carriage further configured to be moveable with the first carriage along the second axis;
a gearbox disposed within and moveable with the second carriage, the gearbox configured to be coupled with the spindle;
a drive pulley coupled with the spindle via the gearbox, the gear box further configured to transfer a rotational movement of the spindle to the drive pulley;
a plurality of idler pulleys mounted on the second gantry, the plurality of idler pulleys rotatable on a plane of rotation perpendicular to a plane of rotation of the spindle; and
a wire tension mechanism, comprising:
an extension leg attached to or integrally formed with a first elongated support leg of the pair of parallel elongated support legs, the extension leg extended from the top end of the first elongated support leg along a longitudinal axis of the first elongated support leg;
a curved guide rail, a first end of the curved guide rail attached to or integrally formed with a top end of the extension leg, a second opposing end of the curved guide rail attached to or integrally formed with the top end of a second elongated support leg of the two elongated support legs, the curved guide rail bent downward on a transverse plane, the transverse plane parallel with the pair of parallel elongated support legs and the upper transverse beam;
a vertical guide rail extended upward along a third axis from a top end of the second carriage, the third axis perpendicular to the second axis;
a first bearing block slidably coupled with the vertical guide rail, the first bearing block moveable along the third axis, the first bearing block further comprising a follower coupled with and moveable along the curved guide rail; and
a top tension wheel mounted on the first bearing block, the top tension wheel rotatable about a rotational axis perpendicular to the upper transverse beam; and
a wire attached to the drive pulley, the plurality of idler pulleys, and the top tension wheel, the drive pulley configured to drive the wire to travel through the drive pulley, the plurality of idler pulleys, and the top tension wheel, in an endless wire loop.

2. The system of claim 1, wherein the second gantry further comprises:
an upper guide rod mounted on and extended along the upper transverse beam,
wherein the second carriage is slidably coupled with the upper guide rod, the second carriage slidable along a longitudinal axis of the upper transverse beam.

3. The system of claim 2, wherein the first carriage is coupled with a first drive screw, the first drive screw configured to actuate a translational movement of the first carriage along the second axis.

4. The system of claim 3, wherein the first gantry is further coupled with a second drive screw, the second drive screw configured to actuate a translational movement of the first gantry along the first axis relative to the worktable, the first axis and the second axis mutually perpendicular with an axis that is normal to the top surface of the worktable.

5. The system of claim 1, wherein the gearbox comprises:
a bevel gear set coupled between the spindle and the drive pulley, the bevel gear set configured to transfer the rotational movement of the spindle to the drive pulley, a rotational axis of the spindle perpendicular to a rotational axis of the drive pulley.

6. The system of claim 5, wherein the system further comprises:
a lower transverse beam connected to and transversely extended between the pair of parallel elongated support legs, the lower transverse beam extended along the second axis and parallel with the upper transverse beam;
an open linear bearing comprising a lower linear guide rod mounted on and extended along the lower transverse beam, the open linear bearing further comprising a lower linear bearing block slidably coupled with the lower linear guide rod, the lower linear bearing block slidable along a longitudinal axis of the lower transverse beam;
a lower tension wheel mounted on the lower linear bearing block, a rotational axis of the lower tension wheel parallel with the first axis, the lower tension wheel vertically aligned with the drive pulley along an axis parallel with the pair of parallel elongated support legs, the lower tension wheel rotatable on a plane of rotation of the drive pulley.

7. The system of claim 6, wherein a cutting portion of the endless wire loop comprises a segment of the wire linearly stretched between the drive pulley and the lower tension wheel.

8. The system of claim 7, wherein the plurality of idler pulleys comprise a lower idler pulley mounted on a first elongated support leg of the pair of parallel elongated support legs, the lower idler pulley horizontally aligned with the lower tension wheel along the second axis, the lower idler pulley rotatable on a rotational plane of the lower tension wheel.

9. The system of claim 8, wherein the plurality of idler pulleys further comprise an upper idler pulley mounted on the first elongated support leg of the pair of parallel elongated support legs, the upper idler pulley vertically spaced apart from the lower idler pulley along a longitudinal axis of the first elongated support leg, the upper idler pulley rotatable on a rotational plane of the lower idler pulley.

10. The system of claim 6, wherein the worktable further comprises:
a first plurality of longitudinal grooves on the top surface of the worktable extended along the first axis; and
a plurality of guide rods, each guide rod of the plurality of guide rods disposed within a corresponding longitudinal groove of the first plurality of longitudinal grooves, wherein the lower transverse beam further comprises a second plurality of grooves on a lower surface of the lower transverse beam, the lower surface of the lower transverse beam facing the top surface of the worktable, each groove of the second plurality of grooves coupled with a corresponding guide rod of the plurality of guide rods.

11. The system of claim 1, wherein the follower comprises a rotatable wheel connected to a first side of the first bearing block via a first connecting rod, the rotatable wheel rotatable about a rotational axis parallel with the first axis.

12. The system of claim 11, wherein the top tension wheel mounted on a second side of the first bearing block via a second connecting rod, the second side opposite the first side, the second connecting rod parallel with the first connecting rod.

13. The system of claim 1, wherein the extension leg and the upper transverse beam are of the same length.

14. The system of claim 13, wherein a vertical distance between a given point on the curved guide rail and a corresponding point on the upper transverse beam may be defined by:
wherein, $$z = \frac{2kx}{x+k}$$

z denotes the vertical distance between the given point on the curved guide rail and the corresponding point on the upper transverse beam, x denotes a horizontal distance between the given point on curved guide rail and the second end of the curved guide rail along the second axis, and k denotes the length of the upper transverse beam.

* * * * *